(12) United States Patent
Lambert et al.

(10) Patent No.: US 7,906,476 B2
(45) Date of Patent: Mar. 15, 2011

(54) FABRIC CARE COMPOSITIONS

(75) Inventors: James Michael Lambert, Staunton, VA (US); Hong Liu, Waynesboro, VA (US); Sonia Menot, Ferney-Voltaire (FR); Federica Maria Roberta Stoppa, Genthod (CH)

(73) Assignee: Invista North America s.a.r.l., Wilmington, DE (US)

( * ) Notice: Subject to any disclaimer, the term of this patent is extended or adjusted under 35 U.S.C. 154(b) by 468 days.

(21) Appl. No.: 11/837,609

(22) Filed: Aug. 13, 2007

(65) Prior Publication Data

US 2008/0022464 A1 Jan. 31, 2008

Related U.S. Application Data

(63) Continuation-in-part of application No. 11/654,753, filed on Jan. 18, 2007, and a continuation-in-part of application No. 11/351,967, filed on Feb. 10, 2006, now abandoned, which is a continuation-in-part of application No. 11/300,229, filed on Dec. 13, 2005, now abandoned, which is a continuation-in-part of application No. 11/253,927, filed on Oct. 19, 2005, which is a continuation-in-part of application No. 11/056,067, filed on Feb. 11, 2005, now Pat. No. 7,240,371.

(60) Provisional application No. 60/837,011, filed on Aug. 11, 2006, provisional application No. 60/865,091, filed on Nov. 9, 2006, provisional application No. 60/759,853, filed on Jan. 18, 2006.

(51) Int. Cl.
*C11D 3/37* (2006.01)

(52) U.S. Cl. ....................................................... 510/475
(58) Field of Classification Search ................... 510/475
See application file for complete search history.

(56) References Cited

U.S. PATENT DOCUMENTS

| | | | |
|---|---|---|---|
| 3,653,957 A * | 4/1972 | Schafer et al. | 442/102 |
| 6,766,817 B2 | 7/2004 | da Silva | |
| 6,793,684 B1 * | 9/2004 | Jarvis et al. | 8/116.1 |
| 6,918,404 B2 | 7/2005 | da Silva | |
| 7,066,586 B2 | 6/2006 | da Silva | |

FOREIGN PATENT DOCUMENTS

| | | | |
|---|---|---|---|
| GB | 1207727 | * | 10/1970 |
| WO | WO 2008/022066 A3 | * | 2/2008 |

OTHER PUBLICATIONS

Albert Leo, Corwin Hansch, and David Elkins, Partition Coefficients and Their Uses, Chemical Reviews, vol. 71 (1971) pp. 525-616.
International Standard ISO 15487, Textiles—Method for Assessing Appearance of Apparel and Other Textile and Products After Domestic Washing and Drying, First Edition 1999-12.
Hansch, Quinlan & Lawrence, J. Organic Chemistry, 33, 347-350 (1968), The Linear Free-Energy Relationship between Partition Coefficients and the Aqueous Solubility of Organic.
Von E. Kovats, Gas-Chromatographische Charakterisierung Organischer Verbindungen MT Eng. vol. XKI, Folder VII (1958)-No. 206.

* cited by examiner

*Primary Examiner* — John R Hardee
(74) *Attorney, Agent, or Firm* — Christina W. Geerlof

(57) ABSTRACT

Polyurethaneurea compositions in the form of powders and dispersions are provided for enhancing properties of washed fabric including easy care, better iron gliding, improved shape retention, perfume substantiation and stain management properties.

10 Claims, No Drawings

FABRIC CARE COMPOSITIONS

CROSS-REFERENCE TO RELATED APPLICATIONS

This application claims the benefit of U.S. Provisional Application No. 60/837,011 filed on Aug. 11, 2006 and claims the benefit U.S. Provisional Application No. 60/865,091 filed on Nov. 9, 2006 and is a continuation-in-part of U.S. application Ser. No. 11/351,967 filed on Feb. 10, 2006, now abandoned, which is a continuation-in-part of U.S. application Ser. No. 11/300,229 filed on Dec. 13, 2005 now abandoned, which is a continuation-in-part of pending U.S. application Ser. No. 11/253,927 filed on Oct. 19, 2005, which is a continuation in part of U.S. application Ser. No. 11/056,067 filed on Feb. 11, 2005, now U.S. Pat. No. 7,240,371, and is also a continuation-in-part of pending U.S. application Ser. No. 11/654,753 filed on Jan. 18, 2007, which claims the benefit of U.S. application Ser. No. 60/759,853 filed on Jan. 18, 2006, all of which are incorporated herein by reference.

BACKGROUND OF THE INVENTION

1. Field of the Invention

The present invention includes polyurethaneurea compositions having fabric care properties. Fabric care compositions including detergents and fabric softeners which include the polyurethaneurea compositions are also provided.

2. Summary of Related Art

Fabric softeners are often used in addition to detergents to impart softness and/or fluffiness to washable fabrics. Fabric softeners also make fabrics feel smooth, decrease static cling, impart a pleasing fragrance, reduce drying time, reduce wrinkling and make ironing easier. However, the benefits of these properties generally decrease over time after washing.

The most common active components are based on long chain fatty type molecules called quaternary ammonium compounds, which are cationic in nature. Therefore, in order to prevent undesired reaction with detergents which may be anionic in nature, fabric softeners are generally introduced during fabric rinsing or drying.

In order to reduce the time and expense of fabric laundering, there is a need for fabric care compositions which may be added simultaneously with the detergent. There is also a need for fabric care compositions which extend the duration of the benefits of fragrance substantiation and ease of care associated with fabric softening compositions.

SUMMARY OF THE INVENTION

The present invention provides a polyurethaneurea in the form of a powder or an aqueous dispersion that provides fabric care properties either alone or in combination with a detergent or fabric softener composition.

In one embodiment, a fabric care composition is in the form of non-ionic or anionic film forming dispersion including a polyurethaneurea polymer and water. The polymer is the reaction product of a prepolymer with water as a chain extender where the prepolymer is the reaction product of a glycol or a mixture of glycols and a polyisocyanate such as 4,4'-methylenebis(phenyl isocyanate).

In another embodiment, a fabric care composition is in the form of an ionic film forming dispersion including a polyurethaneurea polymer and water. The ionic nature of the dispersion may be the result of the combination of a non-ionic polymer dispersion with cationic or anionic surfactants or additives. Alternatively, where the dispersion is anionic, this may result from the inclusion of ionic groups in the polyurethaneurea polymer.

In another embodiment is a nonionic non-film-forming dispersion including water and a polyurethaneurea polymer. The polymer is the reaction product of a prepolymer and a chain extender such as a diamine chain extender, water and combinations thereof, where the polymer is the reaction product of a glycol (polyol) or a mixture of glycols and a polyisocyanate such as 4,4'-methylenebis(phenyl isocyanate). The polymer may then be filtered and ground or spray dried to provide a powder.

A further embodiment provides a method of extending perfume or fragrance substantiation on a fabric or garment. The method includes contacting the fabric or garment with a fragrance and a polyurethane urea composition in the form of a powder or an aqueous dispersion. The contact may occur in a variety of ways including, but not limited to, adding the fragrance and polyurethaneurea to a detergent or fabric softener prior to laundering and/or drying the fabric, adding them directly to the wash water, or introducing them during the rinsing cycle, either directly or in combination with a fabric softener composition.

A further embodiment provides a method of providing desired properties to a fabric or garment. The method includes contacting a fabric with a polyurethaneurea in the form of a powder or an aqueous dispersion. The desired properties which may be imparted to the fabric include, but are not limited to, shape retention, shape recovery, ease of care (i.e., ease of ironing, anti-wrinkle), and anti-stain properties.

DETAILED DESCRIPTION OF THE INVENTION

As used herein, the term "powder" means a particulate material consisting of a loose aggregation of finely divided solid particles of which the maximum dimension is smaller than 1 millimeter and the average particle size is less than 100 microns.

As used herein, the term "film-forming" means that the material forms a continuous film in the absence of other reagents under the synthesis conditions disclosed herein.

As used herein, the term "non-film-forming" means that the material does not form a continuous film in the absence of other reagents under the synthesis conditions disclosed herein.

As used herein, the term "fabric" means any woven, non-woven, knit, tuft, felt, braid, or bonded material assembled from fibers and/or yarns, including, but not limited to, those used in garments (clothing), sheets, towels, and curtains.

As used herein, the term "fabric care composition" refers to any composition that may be applied to a fabric, especially during washing or drying of the fabric, to impart beneficial properties to the fabric. These properties include cleaning, removing oily and greasy marks, making fabrics feel smooth, decrease static cling, impart a pleasing fragrance, reduce drying time, reduce wrinkling and make ironing easier.

The polyurethaneurea compositions provided herein provide surprisingly improved shape retention properties to fabrics compared to currently commercially available fabric care compositions. Furthermore, they also provide ease of care or easy care properties to fabrics. In other words, fabrics treated with the polyurethaneurea compositions have fewer wrinkles after washing and are easier to iron.

The polyurethaneurea compositions of some embodiments also have surprisingly good water and oil absorption, especially when applied to a fabric. This is particularly important for anti-stain properties. After a fabric has been contacted with a polyurethaneurea composition of some embodiments, the polyurethaneurea will absorb moisture and oil from stain-causing sources and thereby limit the absorption of the fabric itself.

Due to the absorption properties, the polyurethaneurea compositions also assist in prolonging fragrance substantiation in a fabric which has been contacted by the composition. This results from the absorption and subsequent gradual release of the fragrance by the polyurethaneurea composition.

There is a range of fragrance materials that deposit well on, or are retained well on, polyurethaneurea compositions. Such materials include, but are not limited to, the following two categories, Category A and Category B as set forth below.

Category A: hydroxylic materials which are alcohols, phenols or salicylates, with an octanol/water partition coefficient (P) whose common logarithm ($\log_{10} P$) is 2.5 or greater, and a gas chromatographic Kovats index (as determined on polydimethylsiloxane as non-polar stationary phase) of at least 1050.

The octanol-water partition coefficient (or its common-logarithm "logP") is well-known in the literature as an indicator of hydrophobicity and water solubility (see Hansch and Leo, Chemical Reviews, 71, 526-616, (1971); Hansch, Quinlan and Lawrence, J. Organic Chemistry, 33, 347-350 (1968). Where such values are not available in the literature they may be measured directly, or estimated approximately using mathematical algorithms. Software providing such estimations is available commercially, for example "LogP" from Advanced Chemistry Design Inc.

Materials having $\log_{10} P$ of 2.5 or more are somewhat hydrophobic.

Kovats indices are calculated from the retention time in a gas chromatographic measurement referenced to the retention time for alkanes [see Kovats, Helv. Chim. Acta 41, 1915 (1958)]. Indices based on the use of a non-polar stationary phase have been used in the perfumery industry for some years as a descriptor relating to the molecular size and boiling point of components. A review of Kovats indices in the perfume industry is given by T Shibamoto in "Capillary Gas Chromatography in Essential Oil Analysis", P Sandra and C Bicchi (editors), Huethig (1987), pages 259-274. A common non-polar phase which is suitable is 100% dimethyl polysiloxane, as supplied for example under a variety of trade names such as RP-1 (Hewlett-Packard), CP Sil 5 CB (Chrompack), OV-1 (Ohio Valley) and Rtx-1 (Restek).

Materials of low Kovats index tend to be volatile and are not retained well on many fibers.

Category A includes alcohols of general formula ROH where the hydroxyl group may be primary, secondary or tertiary, and the R group is an alkyl or alkenyl group, optionally branched or substituted, cyclic or acyclic, such that ROH has partition coefficient and Kovats properties as defined above. Alcohols of Kovats index 1050 to 1600 are typically monofunctional alkyl or arylalkyl alcohols with molecular weight falling within the range 150 to 230.

Category A also includes phenols of general formula ArOH, where the Ar group denotes a benzene ring which may be substituted with one or more alkyl or alkenyl groups, or with an ester grouping —$CO_2A$, where A is a hydrocarbon radical, in which case the compound is a salicylate. ArOH has partition coefficient and Kovats index as defined above. Typically, such phenols with Kovats index 1050 to 1600 are monohydroxylic phenols with molecular weight falling within the range 150 to 210.

Examples of fragrance materials in category A are 1-(2'-tert-butylcyclohexyloxy)-butan-2-ol, 3-methyl-5-(2',2', 3'-trimethylcyclopent-3-enyl)-pentan-2-ol, 4-methyl-3-decen-5-ol, amyl salicylate, 2-ethyl-4(2',2',3-trimethylcyclopent-3'-enyl)but-2-enol, borneol, carvacrol, citronellol, 9-decenol, dihydroeugenol, dihydrolinalol, dihydromyrcenol, dihydroterpineol, eugenol, geraniol, hydroxycitronellal, isoamyl salicylate, isobutyl salicylate, isoeugenol, linalool, menthol, nerolidol, nerol, para tert-butyl cyclohexanol, phenoxanol, terpineol, tetrahydrogeraniol, tetrahydrolinalol, tetrahydromyrcenol, thymol, 2-methoxy-4-methylphenol, (4-isopropylcyclohexyl)-methanol, benzyl salicylate cyclohexyl salicylate, hexyl salicylate, patchouli alcohol, and farnesol.

Category B esters, ethers, nitriles, ketones or aldehydes, with an octanol/water partition coefficient (P) whose common logarithm ($\log_{10} P$) is 2.5 or greater, and a gas chromatographic Kovats index (as determined on polydimethylsiloxane as non-polar stationary phase) of at least 1300.

Fragrances of Category B are of general formula RX, where X may be in a primary, secondary or tertiary position, and is one of the following groups: —$CO_2A$, —COA, —OA, —CN or —CHO. The groups R and A are hydrocarbon residues, cyclic or non-cyclic and optionally substituted. Typically, the materials of Category B with Kovats index not exceeding 1600 are monofunctional compounds with molecular weights in the range 160 to 230.

Examples of fragrance materials in category B are 1-methyl-4-(4-methyl-3-pentenyl)-3-cyclohexene-1-carbaldehyde, 1-(5',5'-dimethylcyclohexenyl)-pent-en-1-one, 2-heptyl cyclopentanone, 2-methyl-3-(4'-tert-butylphenyl) propanal, 2-methylundecanal, 2-undecenal, 2,2-dimethyl-3-(4'-ethylphenyl)-propanal, 3-(4'-isopropylphenyl)-2-methylpropanal, 4-methyl-4-phenylpent-2-yl acetate, allyl cyclohexyl propionate, allyl cyclohexyloxyacetate, amyl benzoate, methyl ethyl ketone trimers, benzophenone, 3-(4'-tert-butylphenyl)-propanal, caryophylene, cis-jasmone, citral diethyl acetal, citronellal diethyl acetal, citronellyl acetate, phenylethyl butyl ether, alpha-damascone, beta-damascone, delta-damascone, gamma-decalactone, dihydro isojasmonate, dihydrojasmone, dihydroterpinyl acetate, dimethyl anthranilate, diphenyl oxide, diphenylmethane, dodecanal, dodecen-2-al, dodecane nitrile, 1-ethoxy-1-phenoxyethane, 3-(1'-ethoxyethoxy)-3,7-dimethylocta-1,6-diene, 4-(4'-methylpent-3'-enyl)-cyclohex-3-enal, ethyl tricyclo[5.2.1.0-2,6-]decane-2-carboxylate, 1-(7-isopropyl-5-methylbicyclo[2.2.2]oct-5-en-2-yl)-1-ethanone, allyl tricyclodecenyl ether, tricyclodecenyl propanoate, gamma-undecalactone, n-methyl-n-phenyl-2-methylbutanamide, tricyclodecenyl isobutyrate, geranyl acetate, hexyl benzoate, ionone alpha, ionone beta, isobutyl cinnamate, isobutyl quinoline, isoeugenyl acetate, 2,2,7,7-tetramethyltricycloudecan-5-one, tricyclodecenyl acetate, 2-hexylcyclopentanone, 4-acetoxy-3-pentyltetrahydropyran, ethyl 2-hexylacetoacetate, 8-isopropyl-6-methylbicyclo[2.2.2]oct-5-ene-2-carbaldehyde, methyl 4-isopropyl-1-methylbicyclo[2.2.2]oct-5-ene-2-carboxylate, methyl cinnamate, alpha iso methyl ionone, methyl naphthyl ketone, nerolin, nonalactone gamma, nopyl acetate, para tert-butyl cyclohexyl acetate, 4-isopropyl-1-methyl-2-[1'-propenyl]-benzene, phenoxyethyl isobutyrate, phenylethyl isoamyl ether, phenylethyl isobutyrate, tricyclodecenyl pivalate, phenylethyl pivalate, phenylacetaldehyde hexylene glycol acetal, 2,4-dimethyl-4-phenyltetrahydrofuran, rose acetone, terpinyl acetate, 4-isopropyl-1-methyl-2-[1'-propenyl]-benzene, yara, (4-isopropylcyclohexadienyl)ethyl formate, amyl cinnamate, amyl cinnamic aldehyde, amyl cinnamic aldehyde dimethyl acetal, cinnamyl cinnamate, 1,2,3,5,6,7,8,8a-octathyro-1,2,8,8-tetramethyl-2-acetyl naphthalene, cyclo-1,13-ethylenedioxytridecan-1,13-dione, cyclopentadecanolide, hexyl cinnamic aldehyde, 1,3,4,6,7,8-hexahydro-4,6,6,7,8,8-hexamethylcyclopenta[g]-2-benzopyran, geranyl phenyl acetate, 6-acetyl-1-isopropyl-2,3,3,5-tetramethylindane, and 1,1,2,4,4,7-hexamethyl-6-acetyl-1,2,3,4-tetrahydronaphthalene.

While this is an extensive list of fragrances and perfumes that work especially well with spandex compositions, it is recognized that a variety of other fragrances are also useful in some embodiments. Fragrances may include a substance or mixture of substances including natural (i.e., obtained by extraction of flowers, herbs, leaves, roots, barks, wood, blossoms or plants), artificial (i.e., a mixture of different nature oils or oil constituents) and synthetic (i.e., synthetically produced) odoriferous substances.

A non-limiting list of useful fragrances includes: hexyl cinnamic aldehyde; amyl cinnamic aldehyde; amyl salicylate; hexyl salicylate; terpineol; 3,7-dimethyl-cis-2,6-octadien-1-ol; 2,6-dimethyl-2-octanol; 2,6-dimethyl-7-octen-2-ol; 3,7-dimethyl-3-octanol; 3,7-dimethyl-trans-2,6-octadien-1-ol; 3,7-dimethyl-6-octen-1-ol; 3,7-dimethyl-1-octanol; 2-methyl-3-(para-tert-butylphenyl)-propionaldehyde; 4-(4-hydroxy-4-methylpentyl)-3-cyclohexene-1-carboxaldehyde; tricyclodecenyl propionate; tricyclodecenyl acetate; anisaldehyde; 2-methyl-2-(para-iso-propylphenyl)-propionaldehyde; ethyl-3-methyl-3-phenyl glycidate; 4-(para-hydroxyphenyl)-butan-2-one; 1-(2,6,6-trimethyl-2-cyclohexen-1-yl)-2-buten-1-one; para-methoxyacetophenone; para-methoxy-alpha-phenylpropene; methyl-2-n-hexyl-3-oxo-cyclopentane carboxylate; undecalactone gamma, orange oil; lemon oil; grapefruit oil; bergamot oil; clove oil; dodecalactone gamma; methyl-2-(2-pentyl-3-oxo-cyclopentyl) acetate; beta-naphthol methylether; methyl-beta-naphthylketone; coumarin; decylaldehyde; benzaldehyde; 4-tert-butylcyclohexyl acetate; alpha,alpha-dimethylphenethyl acetate; methylphenylcarbinyl acetate; cyclic ethyleneglycol diester of tridecandioic acid; 3,7-dimethyl-2,6-octadiene-1-nitrile; ionone gamma methyl; ionone alpha; ionone beta; petitgrain; methyl cedrylone; 7-acetyl-1,2,3,4,5,6,7,8-octahydro-1,1,6,7-tetramethyl-naphthalene; ionone methyl; methyl-1,6,10-trimethyl-2,5,9-cyclododecatrien-1-yl ketone; 7-acetyl-1,1,3,4,4,6-hexamethyl tetralin; 4-acetyl-6-tert-butyl-1,1-dimethyl indane; benzophenone; 6-acetyl-1,1,2,3,3,5-hexamethyl indane; 5-acetyl-3-isopropyl-1,1,2,6-tetramethyl indane; 1-dodecanal; 7-hydroxy-3,7-dimethyl octanal; 10-undecen-1-al; iso-hexenyl cyclohexyl carboxaldehyde; formyl tricyclodecan; cyclopentadecanolide; 16-hydroxy-9-hexadecenoic acid lactone; 1,3,4,6,7,8-hexahydro-4,6,6,7,8,8-hexamethylcyclopenta-gamma-2-benzopyran-e; ambroxane; dodecahydro-3a,6,6,9a-tetramethylnaphtho-[2,1 b]furan; cedrol; 5-(2,2,3-trimethylcyclopent-3-enyl)-3-methylpentan-2-ol; 2-ethyl-4-(2,2,3-trimethyl-3-cyclopenten-1-yl)-2-buten-1-ol; caryophyllene alcohol; cedryl acetate; para-tert-butylcyclohexyl acetate; patchouli; olibanum resinoid; labdanum; vetivert; copaiba balsam; fir balsam; hydroxycitronellal and indol; phenyl acetaldehyde and indol; geraniol; geranyl acetate; linalool; linalyl acetate; tetrahydrolinalool; citronellol; citronellyl acetate; dihydromyrcenol; dihydromyrcenyl acetate; tetrahydromyrcenol; terpinyl acetate; nopol; nopyl acetate; 2-phenylethanol; 2-phenylethyl acetate; benzyl alcohol; benzyl acetate; benzyl salicylate; benzyl benzoate; styrallyl acetate; dimethylbenzylcarbinol; trichloromethylphenylcarbinyl methylphenylcarbinyl acetate; isononyl acetate; vetiveryl acetate; vetiverol; 2-methyl-3-(p-tert-butylphenyl)-propanal; 2-methyl-3-(p-isopropylphenyl)-propanal; 3-(p-tert-butylphenyl)-propanal; 4-(4-methyl-3-pentenyl)-3-cyclohexenecarbaldehyde; 4-acetoxy-3-pentyltetrahydropyran; methyl dihydrojasmonate; 2-n-heptylcyclopentanone; 3-methyl-2-pentyl-cyclopentanone; n-decanal; n-dodecanal; 9-decenol-1; phenoxyethyl isobutyrate; phenylacetaldehyde dimethylacetal; phenylacetaldehyde diethylacetal; geranonitrile; citronellonitrile; cedryl acetal; 3-isocamphylcyclohexanol; cedryl methylether; isolongifolanone; aubepine nitrile; aubepine; heliotropine; eugenol; vanillin; diphenyl oxide; hydroxycitronellal ionones; methyl ionones; isomethyl ionomes; irones; cis-3-hexenol and esters thereof; indane musk fragrances; tetralin musk fragrances; isochroman musk fragrances; macrocyclic ketones; macrolactone musk fragrances; ethylene brassylate, and combinations thereof.

The polyurethaneurea compositions of some embodiments may be in the form of an aqueous dispersion or a powder. When a powdered form is desired, it may be isolated from the aqueous dispersion by filtering, drying and grinding or by spray drying of the dispersion. For either the film-forming or non-film-forming dispersions, the solids content of the dispersion may vary. For example, solids content may be from about 5% to about 50%, including from about 20% to about 40% by weight of the dispersion, and from about 32% to about 37% by weight of the dispersion.

The viscosity of the dispersion may also vary depending on the use. Examples of suitable viscosities include from about 4 cps to about 36 cps, including from about 8 cps to about 20 cps. When the dispersion is to be added to a fabric care composition such as a detergent or fabric softener, it may be desirable to have a viscosity similar to the fabric care composition.

The pH of the dispersions may also vary depending on their use. When the fabric care composition to which the dispersion will be added is acidic, the pH of the dispersion should be neutral to acidic and desirably of a similar pH to the fabric care composition, including pH 7 or less such as pH 2-4.

To prepare the anionic film-forming aqueous dispersion of some embodiments, a prepolymer is prepared which is a capped glycol. An example of a suitable prepolymer is the reaction product of:

at least one hydroxyl-terminated polymer such as a polyether (including copolyethers), polycarbonate or polyester polyol component having a number average molecular weight of about 600 to about 3,500, for example, a poly (tetramethylene ether) glycol having a number average molecular weight of about 1,400 to about 2,400;

a polyisocyanate, which is a mixture of 4,4'- and 2,4'-methylene bis(phenyl isocyanate) (MDI) isomers, with the ratio of the 4,4'-MDI to 2,4'-MDI isomers from about 65:35 to about 35:65; and at least one diol compound with: (i) hydroxy groups capable of reacting with the mixture of MDI isomers of the polyisocyanate and (ii) at least one carboxylic acid group capable of forming a salt upon neutralization, wherein the at least one carboxylic acid group is incapable of reacting with the mixture of MDI isomers of the polyisocyanate.

The prepolymer is then neutralized to form a salt, for example by inclusion of triethylamine and finally chain extended with a diamine chain extender and water to form the aqueous dispersion. Additives such as surfactants, anti-/defoamers, antioxidants, thickening agents, and combinations thereof, may be included.

The MDI isomer mixture useful for the anionic dispersion achieves a reduction in the prepolymer viscosity without the addition of a solvent. The MDI isomer mixture also serves to reduce the rate of the reaction. The prepolymer may be prepared either in a batch process or in a continuous process.

When included in some embodiments, the diol including hydroxy groups and a carboxylic acid group may be described as an acidic diol. Examples of useful acidic diols include 2,2-dimethylolacetic acid, 2,2-dimethylolpropionic acid (DMPA), 2,2-dimethylolbutanoic acid, 2,2-dimethylolpentanoic acid, and combinations thereof.

The nonionic film-forming dispersion of some embodiments includes a prepolymer, which is an isocyanate-terminated polyurethane prepolymer. An example of a suitable prepolymer is the reaction product of a hydroxyl-terminated polymer such as a polyol, such as poly(tetramethylene-co-ethylene ether) glycol or a mixture of poly(tetramethylene ether) glycol with ethoxylated polypropylene glycol and a diisocyanate such as 4,4'-methylenebis(phenyl isocyanate). This prepolymer is then chain extended with water and dispersed in water or dispersed in water followed by chain extension with water.

The nonionic non-film-forming dispersion of some embodiments includes a prepolymer, which is an isocyanate-terminated polyurethane prepolymer. This prepolymer is also the reaction product of a polyol such as a polybutadiene glycol or poly(tetramethylene ether) glycol and a diisocyanate such as 4,4'-methylenebis(phenyl isocyanate). This prepolymer may be chain extended with a combination of water and a diamine chain extender such as ethylene diamine or an amine-functional crosslinker such as polyvinylamine. Either a hydrophilic or hydrophobic glycol may be selected to produce a polymer powder having different water/oil absorbing capabilities. Also, the powder particle size can be adjusted by adjusting the viscosity of the prepolymer with the use of a solvent for dilution.

The dispersions of some embodiments may include a prepolymer which is a capped glycol which is dispersed into water for chain extension. For the preparation of these dispersions, the water may be cooled to allow more complete dispersion prior to beginning the chain extension reaction. For example the water may be cooled to about 10° C. or less, including about 7° C. or less. Water from many sources is useful with the dispersion of some embodiments such as distilled water, deionized water or ultra pure water.

The average particle size of the particles in the dispersions may vary for either the non-film-forming or film-forming-dispersions. As mentioned above, one factor that affects particle size is the viscosity of the prepolymer. Another factor is the speed of the dispersion, which for example may be from about 5000 rpm to about 10,000 rpm including 7,000 rpm. Particle size ranges for the dispersions and powders of some embodiments include from about 400 microns (μm) or fewer such as from about 0.01 μm to about 0.5 μm, 0.1 μm to about 1.0 μm, about 0.1 μm to about 5.0 μm, about 0.15 μm to about 0.65 μm, and larger particles such as from about 10 μm to about 150 μm.

In some embodiments, a polyurethaneurea powder is made by high shear force dispersion of an isocyanate terminated prepolymer, with or without solvent, into a water medium containing a dispersant, and a chain extension reagent or a cross-linking agent. High shear force is defined as force sufficient to make particles no larger than 500 microns. The prepolymer can be made by reacting a polyol or a polyol copolymer or a polyol mixture, such as polyether glycols, polyester glycols, polycarbonate glycols, polybutadiene glycols or their hydrogenated derivatives, and hydroxy-terminated polydimethylsiloxanes, with a diisocyanate such as methylene bis(4-phenylisocyanate) (MDI) to form an NCO-terminated prepolymer or a "capped glycol". In a polymer composition, the molar ratio of NCO/OH is in the range of 1.2 to 5.0. An example of a chain extension reagent is an aliphatic diamine such as ethylene diamine (EDA).

Where cross-linking of the powders is desired, a chain cross-linking agent may be an organic compound or a polymer with at least three primary amine or secondary amine functional groups capable of reacting with NCO groups.

An organic solvent, soluble or insoluble in water, such as 1-methyl 2-pyrrolidinone (NMP) or xylenes can be used to dilute the prepolymer prior to the dispersion. The formed polyurethaneurea polymer fine particles dispersed in water can be used as such or isolated by filtration and drying into solid powders. Alternatively, a spray coating process which also provides a greater control of particle size may also be used. Another useful method is centrifuge drying.

The particle size of the powders of some embodiments may vary depending on the desired use. For example, the average particle size may be less than 1 millimeter (mm), also including an average particle size of less than 100 microns (μm).

In some embodiments, a segmented polyurethaneurea for making an elastomeric powder includes: a) a polyol or a polyol copolymer or a polyol mixture of number average molecular weight between 500 to 5000, including but not limited to polyether glycols, polyester glycols, polycarbonate glycols, polybutadiene glycols or their hydrogenated derivatives, and hydroxy-terminated polydimethylsiloxanes; b) a diisocyanate including aliphatic diisocyanates, aromatic diisocyanates and alicyclic diisocyanates; and c) an aliphatic diamine (i.e., a diamine chain extender) or its mixture with at least one diamine selected from the group consisting of an aliphatic diamine and an alicyclic diamine, each having 2 to 13 carbon atoms, or an amino-terminated polymer, or an organic compound or a polymer with at least three primary or secondary amine groups; and optionally a monoamine, primary or secondary, as a chain terminator.

Examples of polyether polyols that can be used in some embodiments include those glycols with two or more hydroxy groups, from ring-opening polymerization and/or copolymerization of ethylene oxide, propylene oxide, trimethylene oxide, tetrahydrofuran, and 3-methyltetrahydrofuran, or from condensation polymerization of a polyhydric alcohol, for example, a diol or diol mixtures, with less than 12 carbon atoms in each molecule, such as ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. For example, a linear, bifunctional polyether polyol may be included, specifically, a poly(tetramethylene ether) glycol of molecular weight of about 1,700 to about 2,100, such as Terathane® 1800 (commercially available from Invista S.à r.l. of Wichita, Kans. and Wilmington, Del.) with a functionality of 2. Other examples of useful commercially available polyether polyols are marketed as Acclaim® 4220N available from Bayer, Pittsburgh, Pa. and PLURACOL® 1062P available from BASF, Wyandotte, Mich. Other useful polyols include copolymers of tetrahydrofuran and ethylene oxide, and copolymers of ethylene oxide and propylene oxide, among others. More than one type of polyol may be combined to provide the polyurethaneurea compositions of some embodiments. For example, when two different polyols are used, they may be combined in a ratio from about 25:75 to about 75:25 including from about 40:60 to about 60:40 and about 50:50.

Examples of polyester polyols that can be used include those ester glycols with two or more hydroxy groups, produced by condensation polymerization of aliphatic polycarboxylic acids and polyols, or their mixtures, of low molecular weights with no more than 12 carbon atoms in each molecule. Examples of suitable polycarboxylic acids are malonic acid, succinic acid, glutaric acid, adipic acid, pimelic acid, suberic acid, azelaic acid, sebacic acid, undecanedicarboxylic acid and dodecanedicarboxylic acid. Example of suitable polyols for preparing the polyester polyols are ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. For example, a linear, bifunctional polyester polyol with a melting temperature of about 5° C. to about 50° C. may be included.

Examples of polycarbonate polyols that can be used include those carbonate glycols with two or more hydroxy groups, produced by condensation polymerization of phosgene, chloroformic acid ester, dialkyl carbonate or diallyl carbonate and aliphatic polyols, or their mixtures, of low molecular weights with no more than 12 carbon atoms in each molecule. Example of suitable polyols for preparing the polycarbonate polyols are diethylene glycol, 1,3-propanediol, 1,4-butanediol, 1,5-pentanediol, 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. For example, a linear, bifunctional polycarbonate polyol with a melting temperature of about 5° C. to about 50° C. may be included.

Examples of suitable diisocyanate components are 1,6-diisocyanatohexane, 1,12-diisocyanatododecane, isophorone diisocyanate, trimethyl-hexamethylenediisocyanates, 1,5-diisocyanato-2-methylpentane, diisocyanato-cyclohexanes, methylene-bis(4-cyclohexyl isocyanate), tetramethyl-xylenediisocyanates, bis(isocyanatomethyl)cyclohexanes, toluenediisocyanates, methylene bis(4-phenyl isocyanate), phenylenediisocyanates, xylenediisocyanates, and a mixture of such diisocyanates. For example the diisocyanate may be an aromatic diisocyanate such phenylenediisocyanate, tolylenediisocyanate (TDI), xylylenediisocyanate, biphenylenediisocyanate, naphthylenediisocyanate, diphenylmethanediisocyanate (MDI) (including 4,4'-methylene bis(phenyl isocyante), 2,4'-methylene bis(phenyl isocyante), and combinations thereof), and combinations of one or more diisocyanates.

Examples of suitable diamine components (diamine chain extenders) are ethylenediamine, 1,2-propanediamine, 1,3-propanediamine, 2,2-dimethyl-1,3-propanediamine, 1,4-butanediamine, 1,5-pentanediamine, hexamethylene diamine, 1,7-heptanediamine, 1,8-octanediamine, 1,9-nonanediamine, 1,10-decanediamine, 1,12-dodecanediamine, 2-methyl-1,5-pentanediamine, cyclohexanediamines, cyclohexanebis(methylamine)s, isophorone diamine, xylylenediamines, and methylenebis(cyclohexylamine)s. A mixture of two or more diamines can also be used. As mentioned above, water may also be included as a chain extender.

Examples of suitable amine-terminated polymers are bis (3-aminopropyl) terminated polydimethylsiloxane, amine terminated poly(acrylonitrile-co-butadiene), bis(3-aminopropyl) terminated poly(ethylene glycol), bis(2-aminopropyl) terminated poly(propylene glycol), and bis(3-aminopropyl) terminated polytetrahydrofuran.

Examples of suitable organic compounds or polymers with at least three primary or secondary amine groups are tris-2-aminoethyl amine, poly(amido amine) dendrimers, polyethylenimine, poly(vinylamine), and poly(allylamine).

Examples of the suitable monoamine component include primary alkylamines such as ethylamine, butylamine, hexylamine, cyclohexylamine, ethanolamine and 2-amino-2-methyl-1-propanol, and secondary dialkylamines such as N,N-diethylamine, N-ethyl-N-propylamine, N,N-diisopropylamine, N-tert-butyl-N-methylamine, N-tert-butyl-N-benzylamine, N,N-dicyclohexylamine, N-ethyl-N-isopropylamine, N-tert-butyl-N-isopropylamine, N-isopropyl-N-cyclohexylamine, N-ethyl-N-cyclohexylamine, N,N-diethanolamine, and 2,2,6,6-tetramethylpiperidine.

In making a polyurethaneurea powder of some embodiments, a glycol is first reacted with a diisocyanate, optionally with a catalyst present, to form an NCO-terminated prepolymer or a "capped glycol". This reaction is typically carried out, in a molten form of uniformly blended mixture, with applied heat at temperatures of 45 to 98° C. for a period of 1 hour to 6 hours. The amounts of each reaction component, the weight of the glycol (Wgl) and the weight of the diisocyanate (Wdi), are regulated by the capping ratio (CR), which is defined as the mole ratio of the diisocyanate to the glycol as shown below:

$$CR=(Wdi/MWdi)/(Wgl/MWgl)$$

Where MWdi is the molecular weight of the diisocyanate and MWgl is the number average molecular weight of the glycol. According to the present invention, the capping ratio is in the range of 1.2 to 5.0, specifically between 1.5 and 3.0.

After the capping reaction is complete when all of the hydroxy (—OH) groups from the glycol molecules are consumed by the isocyanate (—NCO) groups from the diisocyanate to form a urethane bond, a viscous polyurethane prepolymer with terminal NCO groups is formed. This prepolymer is then added and dispersed into a water solution containing surface active reagents such as dispersants and anti-/defoamers and optionally chain-extending agents such as diamines. Alternatively, this prepolymer can be diluted with an organic solvent such as water-soluble N-methylpyrrolidone (NMP) or water-insoluble xylenes before dispersed in the water medium. The solid polymer particles are formed under the high shear force during the dispersion and upon the chain extension with water and/or diamine extenders. These polyurethaneurea particles can then be filtered and dried.

The polyurethaneurea compositions prepared by the methods described above have surprisingly good water and oil absorption, especially when applied to a fabric. This is particularly important for anti-stain properties. After a fabric has been contacted with a polyurethaneurea composition of some embodiments, the polyurethaneurea will absorb moisture and oil from stain-causing sources and thereby limit the absorption of the fabric itself.

Due to the absorption properties, the polyurethaneurea compositions also assist in prolonging fragrance substantiation in a fabric which has been contacted by the composition. This results from the absorption and subsequent gradual release of the fragrance by the polyurethaneurea composition.

The fabric care composition of some embodiments may include a fabric softener or detergent to which the polyurethaneurea compositions may be added. These polyurethaneurea compositions may also be in any form such as a dispersion or powder. Alternatively, the polyurethaneurea composition may be added directly to the fabric, to a washing machine, wash water (for hand washing), or to an automatic dryer.

Furthermore, the powder or dispersion may be used as a replacement of fabric softener to deliver anti stain properties to garments via home laundering. Fabric softeners are frequently used to deliver perfume or fragrance to fabrics and secondarily to deliver fabric softness. The fabric softening aspect is not necessarily needed when tumble drying is used since fabrics which are tumble dried are already very soft.

The detergent compositions of some embodiments normally contain an anionic, nonionic, amphoteric or ampholytic surfactant or a mixture thereof, and frequently contains in addition an organic or inorganic builder.

Fabric softeners will generally include an active component such as a quaternary ammonium salt. Examples of non-cyclic quaternary ammonium salts include tallow trimethyl ammonium chloride; ditallow dimethyl ammonium chloride; ditallow dimethyl ammonium methyl sulfate; dihexadecyl dimethyl ammonium chloride; di(hydrogenated tallow) dimethyl ammonium chloride; dioctadecyl dimethyl ammonium chloride; dieicosyl dimethyl ammonium chloride; didocosyl dimethyl ammonium chloride; di(hydrogenated tallow) dimethyl ammonium methyl sulfate; dihexadecyl diethyl ammonium chloride; dihexadecyl dimethyl ammonium acetate; ditallow dipropyl ammonium phosphate; ditallow dimethyl ammonium nitrate; and di(coconut-alkyl) dimethyl ammonium chloride.

Other optional components of the fabric care compositions of some embodiments conventional in nature, and generally are present from about 0.01% to about 10% by weight of the composition or dispersion, including from about 0.05 to about 5%, and including from about 2% to about 4%. Such optional components include, but are not limited to, colorants, perfumes, bacterial inhibitors, optical brighteners, opacifiers, viscosity modifiers, fabric conditioning agents in solid form such as clay, fabric absorbency boosters, emulsifiers, stabilizers, shrinkage controllers, spotting agents, germicides, fungicides, anti-corrosion agents, etc. Other examples of additives include preservatives such as lactic acid, antioxidants, pigments, colorants, fragrances, anti-microbial agents (like silver), active ingredients (moisturizers, UV-screens), surfactants, anti-/defoamers, solvents and the like can be blended into the polyurethaneurea compositions before, during or after the dispersion of the prepolymer. Any active may be used alone or in combination with other additives of similar or dissimilar types. For example, suitable surfactants include those available under the brands BIO-SOFT® and Stepantex® from Stepan Company, Northfield, Ill. and Tetranyl available from KAO Corporation. A combination of these surfactants may be used in any suitable amount such as a 50/50 blend.

The fabric care compositions of the present invention can be prepared by conventional methods. Homogenizing is not necessary. A convenient and satisfactory method is to prepare a premix of softeners in water at about 150° F. which is then added to a hot aqueous solution of the other components. Temperature-sensitive components can be added after the fabric conditioning composition is cooled to about room temperature.

The fabric care compositions of some embodiments may be used by adding to the rinse cycle of conventional home laundry operations. Alternatively, the fabric care compositions may be added to a detergent prior to the wash cycle, directly to the fabric, or with hand washing, either as part of a detergent or fabric softening composition or directly to the wash water.

The fabric care compositions may be applied in any form known in the art such as a powder, a liquid, a solid tablet, an encapsulate liquid (for example a composition encapsulated with polyvinylalcohol), or in the case of application for an automatic dryer, in a non-woven sheet.

The fabric care compositions of some embodiments may be added in any amount necessary to achieve the desired properties of the fabric. For example, the fabric care compositions may be added in an amount from about 0.05% to about 1.5%, for example, from about 0.2% to about 1%, by weight of the aqueous rinsing bath or wash water.

When present as an aqueous dispersion, the polyurethaneurea compositions of some embodiments may be present in the fabric care composition from about 0.1% to about 20% by weight of the fabric care composition, for example from about 5% to about 15% and from about 0.5 to 3%. When present as a powder, the polyurethaneurea compositions may be present in the fabric care composition from about 0.1% to about 20% by weight of the fabric care composition, for example from about 0.5% to about 10%, or from about 1% to about 5%.

Alternatively, the polyurethaneurea powder or dispersion may be added as a replacement for the fabric care composition instead of as a component of the fabric care composition, where the polyurethaneurea composition may be added as 100%. In this instance, the polyurethaneurea composition may be added directly to the wash water or rinsing water in amount from about 0.05% to about 1.5%, specifically, from about 0.2% to about 1%, by weight of the rinsing water or wash water.

The features and advantages of the present invention are more fully shown by the following examples which are provided for purposes of illustration, and are not to be construed as limiting the invention in any way.

EXAMPLES

Example 1

Capped glycol prepolymer, formed from Terathane® E2538 glycol (Supplied by Invista, S.à r.l.) and Isonate® 125MDR and with a capping ratio of 1.696, was obtained from a developmental LYCRA® spandex production line. LYCRA® is Invista's registered trademark for spandex. This prepolymer of 300 grams was mixed with 150 grams of NMP solvent in a plastic bottle for 10 minutes to reduce the viscosity. The diluted mixture was poured into a steel tube to be injected into a stainless steel container for dispersing. The container had 2000 grams of de-ionized water, 30 grams of T DET N14 surfactant (commercially available from Harcros of Kansas City, Kans.) and 4.5 grams of ethylenediamine chain extender which were premixed and cooled to 5° C. The diluted prepolymer was injected under air pressure at about 40 psi through a tubing of ⅛ inch inner diameter, a high-speed laboratory disperser (model number, HSM-100LC commercially available from Charles Ross & Son Company of Hauppauge, N.Y.) was operated at 5000 rpm. The addition of diluted prepolymer was completed within 15 minutes, the formed milky dispersion was continued to disperse for additional 5 minutes. Back weighing of the container gave the total amount of diluted capped glycol added into the dispersion being 328 grams, equivalent to 218.7 grams of capped glycol prepolymer added into the dispersion. Additive 65 foam controlling agent of 3 grams (commercially from Dow Corning of Midland, Mich.) was added to the dispersion, and the dispersion was allowed for mixing at 5000 rpm for another 30 minutes before pouring into a plastic bottle.

The average particle size of the dispersion was determined to be 52.83 micron, with 95% of the particles below 202.6 microns, by the use of a Microtrac X100 particle size analyzer (Leeds, Northrup).

Example 2

The same ingredients and dispersion procedures were used as in Example 1, except that 4.5 grams ethylenediamine chain extender was added after the diluted prepolymer was dispersed into water mixture. Back weighing of the container gave the total amount of diluted capped glycol added into the dispersion being 329 grams, equivalent to 219 grams of capped glycol prepolymer added into the dispersion. The average particle size of the dispersion was determined to be 33.45 micron, with 95% of the particles below 64.91 microns. The solid polymer particles do not form into films when isolated.

Example 3

Capped glycol prepolymer was prepared by reacting 500 grams of Krasol® HLB 2000 glycol (Supplied by Sartomer Company, Inc. at Exton, Pa.) and 105.86 grams of Isonate® 125MDR at 90° C. for 120 minutes in a 2000 ml reaction kettles equipped with a heating mantle and a mechanical agitator. The reaction was carried out in a nitrogen filled dry box. After the reaction, the prepolymer had a NCO group wt % of 2.98 as determined by titration method. This prepolymer was poured into a steel tube to be injected into a stainless steel container for dispersing. De-ionized water (2000 grams) was mixed at room temperature in the container with 30 grams of T DET N14 surfactant (commercially available from Harcros of Kansas City, Kans.) and 3 grams of Additive 65 foam controlling agent (commercially from Dow Corning of Midland, Mich.). The prepolymer was injected under air pressure at about 80 psi through a tubing of ⅛ inch inner diameter, a high-speed laboratory disperser (model number, HSM-100LC commercially available from Charles Ross & Son Company of Hauppauge, N.Y.) was operated at 5000 rpm. The addition of diluted prepolymer was completed within 15 minutes, the formed milky dispersion was continued to disperse for additional 5 minutes. Back weighing of the container gave the total amount of diluted capped glycol added into the dispersion being 422 grams. Ethylenediamine chain extender of 4.5 grams was added to the dispersion and the dispersion was allowed for mixing at 5000 rpm for another 30 minutes. The average particle size of the formed dispersion was determined to be 49.81 micron, with 95% of the particles below 309.7 microns.

Example 4

The procedures were the same as in Example 3, except that a mixture of glycols with 250 grams of Terathane® 1800 glycol and 250 grams of Krasol® HLB 2000 glycol was used to form the prepolymer. A total of 465 grams of prepolymer was dispersed. The average particle size of the formed dispersion was determined to be 13.67 micron, with 95% of the particles below 38.26 microns.

Example 5

The preparation of the prepolymers was conducted in a glove box with nitrogen atmosphere. A 2000 ml Pyrex® glass reaction kettle, which was equipped with an air pressure driven stirrer, a heating mantle, and a thermocouple temperature measurement, was charged with about 382.5 grams of Terathane® 1800 glycol (commercially available from Invista, S.à r.l., Wichita, Kans.) and about 12.5 grams of 2,2-dimethylopropionic acid (DMPA). This mixture was heated to about 50° C. with stirring, followed by the addition of about 105 grams of Lupranate® Mich. diisocyanate (commercially available from BASF, Wyandotte, Mich.). The reaction mixture was then heated to about 90° C. with continuous stirring and held at about 90° C. for about 120 minutes, after which time the reaction was completed, as the % NCO of the mixture declined to a stable value, matching the calculated value (% NCO aim of 1.914) of the prepolymer with isocyanate end groups. The viscosity of the prepolymer was determined in accordance with the general method of ASTM D1343-69 using a Model DV-8 Falling Ball Viscometer, (sold by Duratech Corp., Waynesboro, Va.), operated at about 40° C. The total isocyanate moiety content, in terms of the weight percent of NCO groups, of the capped glycol prepolymer was measured by the method of S. Siggia, "Quantitative Organic Analysis via Functional Group", 3rd Edition, Wiley & Sons, New York, pp. 559-561 (1963), the entire disclosure of which is incorporated herein by reference.

Example 6

A solvent-free prepolymer, as prepared according to the procedures and composition described in Example 5, was used to make the polyurethaneurea aqueous dispersion of the present invention.

A 2,000 ml stainless steel beaker was charged with about 700 grams of de-ionized water, about 15 grams of sodium dodecylbenzenesulfonate (SDBS), and about 10 grams of triethylamine (TEA). This mixture was then cooled with ice/water to about 5° C. and mixed with a high shear laboratory mixer with rotor/stator mix head (Ross, Model 100LC) at about 5,000 rpm for about 30 seconds. The viscous prepolymer, prepared in the manner as Example 1 and contained in a metal tubular cylinder, was added to the bottom of the mix head in the aqueous solution through flexible tubing with applied air pressure. The temperature of the prepolymer was maintained between about 50° C. and about 70° C. The extruded prepolymer stream was dispersed and chain-extended with water under the continuous mixing of about 5,000 rpm. In a period of about 50 minutes, a total amount of about 540 grams of prepolymer was introduced and dispersed in water. Immediately after the prepolymer was added and dispersed, the dispersed mixture was charged with about 2 grams of Additive 65 (commercially available from Dow Corning®, Midland Mich.). The reaction mixture was then mixed for about another 30 minutes followed by the addition of about 6 grams of diethylamine (DEA) and additional mixing. The resulting solvent-free aqueous dispersion was milky white and stable.

Example 7

Capped glycol prepolymer, formed from Terathane® 1800 glycol and Isonate® 125MDR (commercially available from the Dow Company, Midland, Mich.) and with a capping ratio of 1.688, was obtained from a commercial LYCRA® spandex production line. LYCRA® is Invista's registered trademark for spandex. This prepolymer of 300 grams was mixed with 150 grams of NMP solvent in a plastic bottle for 10 minutes to reduce the viscosity. The diluted mixture was poured into a steel tube to be injected into a stainless steel container for dispersing. The container had 2000 grams of de-ionized water, 30 grams of T DET N14 surfactant (commercially available from Harcros of Kansas City, Kans.) and 3 grams of ethylenediamine chain extender which were premixed and cooled to 5° C. The diluted prepolymer was injected under air pressure at about 40 psi through a tubing of ⅛ inch inner diameter, a high-speed laboratory disperser (model number, HSM-100LC commercially available from Charles Ross & Son Company of Hauppauge, N.Y.) was operated at 5000 rpm. The addition of diluted prepolymer was completed within 15 minutes, the formed milky dispersion was continued to disperse for additional 5 minutes. Back weighing of the container gave the total amount of diluted capped glycol added into the dispersion being 347 grams, equivalent to 231 grams of capped glycol prepolymer added into the dispersion. Additive 65 foam controlling agent of 3 grams (commercially available from Dow Corning of Midland, Mich.) was added to the dispersion, and the dispersion was allowed for mixing at 5000 rpm for another 30 minutes before pouring into a plastic bottle.

The average particle size of the dispersion was determined to be 32.59 micron, with 95% of the particles below 65.98 microns, by the use of a Microtrac X100 particle size analyzer (Leeds, Northrup). The solid polymer particles was filtered using a Buchner funnel with Whatman® filter paper under reduced pressure, rinsed the filter cake with water for three times, and dried at 60-65° C. for 4 hours. The particles did not form into films during the filtration or drying. The dried filter cake was easily ground into fine powders with the use of a laboratory Waring® blender (Blender 700 Model 33BL79 manufactured by Dynamics Inc., New Hartford, Conn.). In commercial practice, the solid particles would be isolated directly from the dispersion using known drying processes such as spray drying. The dried powder had a weight average molecular weight of 352,550 and a number average molecular weight of 85,200 as determined by GPC.

Example 8

In Example 8 the same components and dispersion procedures were used as in Example 7, except that the solvent used to dilute the capped glycol prepolymer was changed to xylenes, and the amount of ethylenediamine chain extender was increased to 4.5 grams. Back weighing of the container gave the total amount of diluted capped glycol added into the dispersion being 339 grams, equivalent to 226 grams of capped glycol prepolymer added into the dispersion.

The average particle size of the dispersion was determined to be 22.88 micron, with 95% of the particles below 46.97 microns. The solid polymer particles do not form into films when isolated.

Example 9

In Example 9 the same components and dispersion procedures were used as in Example 7, except that the ethylenediamine chain extender was replaced by the same amount of a branched polyethylenimine (Mn about 600 by GPC from Aldrich). Back weighing of the container gave the total amount of diluted capped glycol added into the dispersion being 340 grams, equivalent to 227 grams of capped glycol prepolymer added into the dispersion.

The average particle size of the dispersion was determined to be 58.12 micron, with 95% of the particles below 258.5 microns. The solid polymer particles did not form into films when isolated.

Example 10

A glove box with dry nitrogen atmosphere was used to prepare the prepolymer. In two separate 2000 ml Pyrex® glass reaction kettles, which was equipped with an air pressure driven stirrer, a heating mantle and a thermocouple temperature measurement, each was charged with 220.0 grams of Terathane® 1800 glycol (commercially available from Invista) and 220.0 grams of Pluracol® HP 4000D glycol (commercially available from BASF). This glycol mixture was heated to 50° C. with stirring, followed by the addition of 75.03 grams of Isonate® 125MDR (commercially available from Dow Chemical). The reaction mixture was then heated to 90° C. with continuous stirring and held at 90° C. for 120 minutes. Samples were taken from the reactor, and determined to have 2.170 and 2.169% NCO respectively, as measured by the method of S. Siggia, "Quantitative Organic Analysis via Functional Group", 3rd Edition, Wiley & Sons, New York, pp. 559-561 (1963).

A 3000 ml stainless steel beaker was charged with 1600 grams of de-ionized water, 15 grams of T DET N14 surfactant (commercially available from Harcros of Kansas City, Kans.) and 5 grams of Additive 65 (commercially available from Dow Corning). This mixture was then cooled with ice/water to 10° C. and mixed with a high shear laboratory mixer with rotor/stator mix head (Ross, Model 100LC) at 5000 rpm for 30 seconds. The viscous prepolymers, as prepared above in two reactors, were poured into a metal tubular cylinder and was added to the bottom of the mix head in the aqueous solution through a flexible tubing with applied air pressure. The temperature of the prepolymer was maintained between 50-70° C. The extruded prepolymer stream was dispersed and chain-extended with water under the continuous mixing of 5000 rpm. In a period of 5 minutes, a total amount of 616 grams of prepolymer was introduced and dispersed in water. After the prepolymer was added and dispersed, the dispersed mixture was mixed for another 40 minutes. The resulting solvent-free aqueous dispersion was milky white to pale blue color, with 28.84 wt % solids content and 44 centipoises viscosity. The dispersion was cast on a sheet of polyethylene and dried in a fume hood for overnight under ambient conditions to form an elastic continuous film. By GPC measurement, this film had a weight average molecular weight of 127,900 and a number average molecular weight of 41,000.

Example 11

The procedures and conditions were essentially the same as above mentioned Example 10, except that the surfactant was changed to Bio-soft® N1-9 (commercially available from Stepan of Northfield, Ill.). A total of 640 grams of prepolymer, with 2.156 and 2.136% NCO from the two reactors, was dispersed into water. The formed solvent-free dispersion had a solids content of 26.12% and viscosity of 51 centipoises. The cast and dried elastic film had a weight average molecular weight of 133,900 and a number average molecular weight of 44,400.

Example 12

A glove box with dry nitrogen atmosphere was used to prepare the prepolymer. In two separate 2000 ml Pyrex® glass reaction kettles, which was equipped with an air pressure driven stirrer, a heating mantle and a thermocouple temperature measurement, each was charged with 440.0 grams of Terathane® 1800 glycol (commercially available from Invista) and 440.0 grams of Pluracol® 1062 glycol (commercially available from BASF). This glycol mixture was heated to 50° C. with stirring, followed by the addition of 150.0 grams of Isonate® 125MDR (commercially available from Dow Chemical). The reaction mixture was then heated to 90° C. with continuous stirring and held at 90° C. for 120 minutes. Samples were taken from the reactor, and determined to have approximately 2% NCO respectively, as measured by the method of S. Siggia, "Quantitative Organic Analysis via Functional Group", 3rd Edition, Wiley & Sons, New York, pp. 559-561 (1963).

A 3000 ml stainless steel beaker was charged with 1500 grams of ultra pure water that had been cooled to approximately 10° C., 25.9 grams of Bio-soft® N25-9 and 25.9 grams of Stepantex® VT-90 (both available from Stepan Company) and 10 grams of Additive 65 (commercially available from Dow Corning). This mixture was then mixed with a high shear laboratory mixer with rotor/stator mix head (Ross, Model 100LC) at 7000 rpm for 30 seconds. The viscous prepolymers, as prepared above in two reactors, were poured into a metal tubular cylinder and was added to the bottom of the mix head in the aqueous solution through a flexible tubing with applied air pressure. The temperature of the prepolymer was maintained between 50-70° C. The extruded prepolymer stream was dispersed and chain-extended with water under the continuous mixing of 7000 rpm for an additional 2 minutes. This was followed by the addition of 2.33 grams of PURAC® lactic acid preservative. The resulting solvent-free aqueous dispersion was milky white to pale blue color, with 35 wt % solids content.

Example 13

A glove box with dry nitrogen atmosphere was used to prepare the prepolymer. In two separate 2000 ml Pyrex® glass reaction kettles, which was equipped with an air pressure driven stirrer, a heating mantle and a thermocouple temperature measurement, each was charged with 440.0 grams of Terathane® 1800 glycol (commercially available from Invista) and 440.0 grams of Pluracol® 1062 glycol (commercially available from BASF). This glycol mixture was heated to 50° C. with stirring, followed by the addition of 150.0 grams of Isonate® 125MDR (commercially available from Dow Chemical). The reaction mixture was then heated to 90° C. with continuous stirring and held at 90° C. for 120 minutes. Samples were taken from the reactor, and determined to have approximately 2% NCO respectively, as measured by the method of S. Siggia, "Quantitative Organic Analysis via Functional Group", 3rd Edition, Wiley & Sons, New York, pp. 559-561 (1963).

A 3000 ml stainless steel beaker was charged with 1500 grams of ultra pure water that had been cooled to approximately 10° C., 25.9 grams of Bio-soft® N25-9 (available from Stepan Company) and 25.9 grams of Tetranyl® L1/90L available from (KAO Corporation) and 10 grams of Additive 65 (commercially available from Dow Corning). This mixture was then mixed with a high shear laboratory mixer with rotor/stator mix head (Ross, Model 100LC) at 7000 rpm for 30 seconds. The viscous prepolymers, as prepared above in two reactors, were poured into a metal tubular cylinder and was added to the bottom of the mix head in the aqueous solution through a flexible tubing with applied air pressure. The temperature of the prepolymer was maintained between 50-70° C. The extruded prepolymer stream was dispersed and chain-extended with water under the continuous mixing of 7000 rpm for an additional 2 minutes. This was followed by the addition of 2.33 grams of PURAC® lactic acid preservative. The resulting solvent-free aqueous dispersion was milky white to pale blue color, with 35 wt % solids content.

A glove box with dry nitrogen atmosphere was used to prepare the prepolymer. In two separate 2000 ml Pyrex® glass reaction kettles, which was equipped with an air pressure driven stirrer, a heating mantle and a thermocouple temperature measurement, each was charged with 440.0 grams of Terathane® 1800 glycol (commercially available from Invista) and 440.0 grams of Acclaim® 4220N (commercially available from Bayer). This glycol mixture was heated to 50° C. with stirring, followed by the addition of 150.0 grams of Isonate® 125MDR (commercially available from Dow Chemical). The reaction mixture was then heated to 90° C. with continuous stirring and held at 90° C. for 120 minutes. Samples were taken from the reactor, and determined to have approximately 2% NCO respectively, as measured by the method of S. Siggia, "Quantitative Organic Analysis via Functional Group", 3rd Edition, Wiley & Sons, New York, pp. 559-561 (1963).

A 3000 ml stainless steel beaker was charged with 1500 grams of ultra pure water that had been cooled to approximately 10° C., 25.9 grams of Bio-soft® N25-9 and 25.9 grams of Stepantex® VT-90 (both available from Stepan Company) and 10 grams of Additive 65 (commercially available from Dow Corning). This mixture was then mixed with a high shear laboratory mixer with rotor/stator mix head (Ross, Model 100LC) at 7000 rpm for 30 seconds. The viscous prepolymers, as prepared above in two reactors, were poured into a metal tubular cylinder and was added to the bottom of the mix head in the aqueous solution through a flexible tubing with applied air pressure. The temperature of the prepolymer was maintained between 50-70° C. The extruded prepolymer stream was dispersed and chain-extended with water under the continuous mixing of 7000 rpm for an additional 2 minutes. This was followed by the addition of 2.33 grams of PURAC® lactic acid preservative. The resulting solvent-free aqueous dispersion was milky white to pale blue color, with 35 wt % solids content.

Example 15

Cotton/LYCRA® Spandex Woven Fabric Testing

Compositions of the present invention were tested in combination with cotton/LYCRA® spandex woven fabric (97% cotton/3% LYCRA® spandex). The control for this example was fabric washed with non-concentrated Confort™ fabric softener by Unilever. Each of the compositions as shown in Table 1, were used with the cotton/LYCRA® spandex woven fabric by washing with Ariel™ liquid detergent on program 4 at 40° C. on a Schutless® programmable automatic washing machine using standard load fabric to reach 2.5 kg and rinsing with 30 ml of the fabric softener composition. After tumble drying (at moderate temperature), the fabrics were evaluated for any deposit on the surface. Neither of the fabrics showed any deposition of powder or film.

The compositions in Table 1 are as follows:
Fabric softener (control)
Fabric softener, 1% wt of the dispersion of example 6, a film forming anionic polyurethaneurea water, and 2% wt of Unimer (synthetic wax to improved dispersion)
Fabric softener, 1% wt of the polyurethaneurea powder of example 5, and 2% wt of Unimer (synthetic wax to improved dispersion).

Mixing of the compositions (b) and (c) including the fabric softener delivered a homogeneous dispersion (no sedimentation nor agglomeration).

Each fabric was evaluated for easy care. Standard test method AATCC TM 124/ISO 15487 was used to determine the durable press rating ("Drating") before and after ironing. "DP rating" is a measure of the three-dimensional smoothness of the fabric. Iron gliding or ease of ironing was measured as the time for the iron to glide over a given length of fabric with the ironing board at an angle of approximately 20°. The easy care results are shown in Table 1.

TABLE 1

| | Easy Care | | |
| --- | --- | --- | --- |
| Fabric | DP Rating before ironing | DP rating after ironing | ease of ironing (s) |
| (a) | 1 | 1.5 | 5 |
| (b) | 1.5 | 2.5 | 3.5 |
| (c) | 1.5 | 2.5 | 3 |

From the results in Table 1, it is shown that both fabrics treated with powder or dispersion show a better improvement of DP rating (1 point gained after ironing) as compared to the control (0.5 point gained after ironing).

Also the fabrics (b) and (c) treated with the compositions of the present invention show a faster gliding of the iron on the fabric surface.

The compositions (a), (b), and (c) were also evaluated for perfume/fragrance substantiation. Three people were allowed separately smell each of the fabrics. Each of these people observed a stronger fragrance in the treated fabrics (b) and (c) which were treated with the compositions of the present invention.

Absorption properties (moisture management) of fabrics including those treated with the compositions of the present invention have also been tested. These properties were measured to demonstrate the differences of fabrics after treatment with the powders or dispersions of the present invention as compared to untreated fabrics.

For each of the fabrics (a), (b), and (c) as described above, one drop (approximately 30 micro liters) each of linseed oil and water was applied to the surface of the fabric. The time until complete absorption of each droplet was measured and reported in seconds (s) in Table 2. The area of the drop surface at 60 seconds following complete absorption by the fabric was also measured and reported as square centimeters (cm²) in table 2.

TABLE 2

| | Moisture Management | | | |
| --- | --- | --- | --- | --- |
| | absorption time (s) | | planar wicking (cm²) | |
| | water | oil | water | oil |
| (a) | 138 | 434 | 7.28 | 7.56 |
| (b) | 105 | 382 | 4.64 | 6.75 |
| (c) | 81 | 320 | 4.50 | 6.41 |

As shown in Table 2, the dispersion (b) and powder (c) of the present invention offered improvement in comparison to the control (a) with respect to absorption. The use of the powder form (c) showed significant improvement.

Example 16

100% Cotton Woven Fabric Testing

A 100% cotton woven fabric was also tested after treatment with a composition of the present invention. The control for this example was a concentrated fabric softener, Softlan™ Ultra by Colgate Palmolive. Each of the compositions as shown in Table 3, were used with 100% cotton fabric by washing with Ariel™ liquid detergent on program 4 at 40° C. on a Schutless® programmable automatic washing machine using standard load fabric to reach 2.5 kg load and rinsing with 30 ml of the fabric softener composition. After tumble drying (at moderate temperature), the fabrics were evaluated for any deposit on the surface. Neither of the fabrics showed any deposition of power or film.

The compositions in Table 3 are as follows:

(e) Fabric softener (control)

(f) Fabric softener and 10% wt of the dispersion of example 10, a non-ionic polyurethaneurea dispersion Mixing of the composition (f) including the fabric softener delivered a homogeneous dispersion (no sedimentation nor agglomeration).

In order to test the fabrics for growth, first the available stretch or maximum stretch was calculated. The available stretch was determined by first conditioning a fabric specimen followed by cycling three times on a constant-rate-of-extension tensile tester between 0-30N. The maximum stretch was calculated by the following formula:

$$\text{Maximum stretch \%} = (ML - GL) \times 100/GL$$

Where: ML is the length in mm at 30N; and

GL is the gauge length of 250 mm

Separate specimens of each fabric were then extended to 80% of the "available stretch" and held for about 30 min. The fabric specimens were then allowed to relax for about 60 minutes and growth was measured and calculated according to:

$$\text{Growth \%} = L2/L \times 100$$

Where: growth is recorded as a percent after relaxation;

L2=the increased length in cm after relaxation; and

L=the original length in cm

Each of the fabrics (e) and (f) were measured for fabric elongation. The results are shown in Table 3

TABLE 3

| Fabric Growth (weft direction) | |
| --- | --- |
| fabric | growth (%) |
| (e) | 7.4 |
| (f) | 5.8 |

Fabric growth is a measure of shape retention or shape recovery. Growth values represent the un-recovered elongation during wear. A lower value in growth demonstrates that the fabric has a better ability to recover its initial shape.

Fabrics (e) and (f) were also tested for difference in release of perfume after a washing and rinsing cycle. One to two grams of each fabric sample was placed in a sealed gas sampling vessel. Fabric stressing was conducted by shaking with steel ball bearings. The volatile compounds released from the sample were drawn out of the headspace of the gas sampling vessel through a Tenex™ sampling tube using a gas sampling pump operating at 50 cc per minute for 20 minutes. The Tenex™ tube trapped the volatile organic compounds (VOC) for analysis. The Tenex™ tube was then thermally desorbed with the volatile organics directed into a GC/MS for analysis. The results of the VOC measures in Table 3a show that more perfume released from the fabric rinsed with the fabric softener which contains the dispersion of example 10, a non-ionic polyurethaneurea dispersion

TABLE 3a

VOC testing

| Fabric | Volatile concentration ng/L/g |
|---|---|
| (e) | 7 |
| (f) | 48 |

Example 17

Spandex/Cotton Blend Fabric Testing

A spandex/cotton blend woven fabric was also tested after treatment with a composition of the some embodiments. The control for this example was a concentrated fabric softener, Softlan™ Ultra by Colgate Palmolive. Each of the compositions as shown in Table 4, were used with cotton/spandex blend fabric by washing with Ariel™ liquid detergent on program 4 at 40° C. on a Schutless® programmable automatic washing machine using standard load fabric to reach 2.5 kg load and rinsing with 18 g of the fabric softener composition. After tumble drying (at moderate temperature), the fabrics were evaluated for any deposit on the surface. Neither of the fabrics showed any deposition of powder or film.

The compositions in Table 4 are as follows:
(g) Fabric treated with fabric softener only (control)
(h) Fabric treated with fabric softener and 10% wt of the dispersion of example 10, a non-ionic polyurethaneurea dispersion Mixing of the composition (h) including the fabric softener delivered a homogeneous dispersion (no sedimentation, nor agglomeration). Each of the fabrics (g) and (h) were measured for fabric growth. The results are shown in Table 4:

TABLE 4

Fabric Growth (weft direction)

| fabric | growth (%) |
|---|---|
| (g) | 4.8 |
| (h) | 3.8 |

Fabric growth is a measure of shape retention. Growth values represent the un-recovered elongation during wear. A lower value in growth demonstrates that the fabric has a better ability to recover its initial shape Two LYCRA® spandex/cotton blend fabrics were also tested after treatment with a composition of some embodiments. The control for this example was a concentrated fabric softener, Soupline™ Ultra by Colgate Palmolive. Each of the compositions as shown in Tables 4a and 4b, were used with cotton and LYCRA® spandex blend fabric by washing with Dixan® gel detergent available from Henkel Corporation at 40° C. with standard program on a Miele™ commercial washing, using standard load fabric to reach 2.5 kg load and rinsing with 30 ml of fabric softener composition. After tumble drying (at moderate temperature), the fabrics were evaluated for any deposit on the surface. Neither of the fabrics showed any deposition of powder or film. For the fabrics below, CK is a circular knitted fabric with 95% cotton—5% LYCRA® spandex and WOV is a gray weft stretch woven fabric, with 97% cotton—3% LYCRA® spandex.

The compositions in Table 4a and 4b are as follows:
(i)) fabric treated with fabric softener only (control-CK)
(j)) fabric treated with fabric softener and 10% wt (3% active ingredient) of the dispersion of example 10, a non-ionic polyurethaneurea dispersion (treated-CK)
(k) fabric treated with fabric softener only (control-WOV)
(l) fabric treated with fabric softener and 10% wt (3% active ingredient) of the dispersion of example 10, a non-ionic polyurethaneurea dispersion (treated-WOV)

TABLE 4a

Fabric growth CK

| fabric | Growth % |
|---|---|
| (i) length direction | 7.5 |
| (j) length direction | 7.2 |
| (i) width direction | 6.9 |
| (j) width direction | 6.4 |

TABLE 4b

Fabric growth WOV

| fabric | Growth % |
|---|---|
| (k) weft direction | 7.29 |
| (l) weft direction | 6.97 |

Example 18

Cotton Knit Fabric Testing

A 100% cotton circular knit fabric was also tested after treatment with a composition of the some embodiments. The control for this example was washed with a concentrated fabric softener, Softlan™ Ultra by Colgate Palmolive. Each of the compositions as shown in Table 5, were used with cotton fabric by washing with Ariel™ liquid detergent on program 4 at 40° C. on a Schutless® programmable automatic washing machine using standard load fabric to reach 2.5 kg load and rinsing with 30 ml of the fabric softener composition. After tumble drying (at moderate temperature), the fabrics were evaluated for any deposit on the surface. Neither of the fabrics showed any deposition of powder or film.

The compositions in Table 5 are as follows:
(m) Fabric treated with fabric softener only (control)
(n) Fabric treated with fabric softener and 10% wt of the dispersion of example 12 (3% wt solids), where the combination of the dispersion and fabric softener provides a cationic polyurethaneurea dispersion Mixing of the composition used in (n) including the fabric softener provided a homogeneous dispersion (no sedimentation, nor agglomeration). Each of the fabrics (m) and (n) were measured for fabric growth, using a testing method, as described below.

Growth & Recovery Test Method for Circular Knitted Fabrics

DEFINITIONS

"Growth %"—the un-recovered length of a specimen which has been held at a specified elongation (in our case a cycling elongation) for a specific interval of time then allowed to relax for another specific interval of time. Growth is expressed as a percentage of the original length.

"Recovery Power"—the remaining force for specific elongations of a specimen which has been held at a specified elongation (in our case a cycling elongation).

According to the method, fabric specimens, such as circular knit (CK) fabrics, are extended following a programmed cycle described below. At the end of the cycles, "Recovery Power" is measured at different elongations. Specimens are then allowed to relax. "Growth" is measured and calculated after different times of relaxation.

Fabric Specimens were prepared by cutting 7 rectangular of approximately 38 cm×5 cm. The specimens were taken at least 10 cm from the selvedge selecting specimens as far apart as possible in each fabric piece and in such a way that none contains the same yarns. The fabric specimens were then conditioned for at least 16 hours at 20° C.±2° C. and 65%±2% R.H. The specimens were laid on a flat surface and a mark places on each fabric in the middle, 2 lines 28 cm apart.

An "INSTRON" dynamometer, table model No. 5500R was turned on waiting at least 15 minutes to stabilize the load cell. The specimen clamps were mounted and fixed at the 30 cm position. The fabric specimen was mounted on the claims without tension on the fabric. The fabric specimen was extended from 0 to 30% of extension (rate: 900 mm/min) then held at this extension for 1 minute. The specimen was then extended from 30% to 45% of extension 4 times. At the end of the $5^{th}$ cycle, the clamps reach their original position (30 cm). During this last step, force was measured for 45%, 40%, 35%, 30%, 25% and 20% elongation (this is the recovery power).

The fabric specimen was immediately removed from the clamps and allowed to relax on a flat surface. At 1 min, the length between the lines on the fabric was recorded. This measurement was repeated at 10, 20, 30, 60 minutes and 22 hours. The procedure was repeated for each of the remaining fabric specimens Growth was then calculated as:

Growth(%)=(L2−L)/L×100 where: "Growth" in % after relaxation
L2=length in cm between the marked lines after relaxation
L=original length in cm (28 cm)

"Recovery Power" was directly determined on the unload curve Force=f(elongation) at 45%, 40%, 35%, 30%, 25% and 20% of elongation The results after 60 min and 22 hours relaxation are shown in Table 5:

TABLE 5

| | Fabric Growth after 60 minutes (width direction) | |
|---|---|---|
| fabric | Growth after 60 min (%) | Growth after 22 hours (%) |
| (m) | 6.5561 | 6.1735 |
| (n) | 5.2551 | 5.0000 |

Fabric growth is a measure of shape retention. Growth values represent the un-recovered elongation during wear. A lower value in growth demonstrates that the fabric has a better ability to recover its initial shape While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. A fabric care composition comprising:
(a) a detergent or fabric softener composition; and
(b) a polyurethaneurea in the form of an aqueous dispersion;
wherein the weight percent of said detergent or fabric softener composition is greater than the weight percent of said polyurethane aqueous dispersion;
wherein said polyurethaneurea comprises a reaction product of an isocyanate-terminated polyurethane prepolymer and a chain extender;
said prepolymer is a reaction product of a polyether glycol polymer or copolyether glycol polymer; a diisocyanate; and optionally an acidic diol; and
said diisocyante is an aromatic diisocyanate selected from the group consisting of phenylenediisocyanate, tolylenediisocyanate (TDI), xylylenediisocyanate, biphenylenediisocyanate, naphthylenediisocyanate, diphenylmethanediisocyanate (MDI), and combinations thereof.

2. The composition of claim 1, wherein said detergent or fabric softener is compatible for use in a washing machine.

3. The composition of claim 1, wherein said detergent or fabric softener is compatible for hand washing.

4. The composition of claim 1, wherein said detergent or fabric softener is in a form selected from the group consisting of a powder, a liquid, a solid tablet, an encapsulated liquid, and a non-woven sheet.

5. The composition of claim 1, wherein said chain extender is selected from the group consisting of a diamine chain extender, water, and combinations thereof.

6. The composition of claim 1, wherein said aqueous dispersion is selected from the group consisting of an anionic dispersion and a non-ionic dispersion.

7. The composition of claim 1, wherein said acidic diol is selected from the group consisting of 2,2-dimethylolacetic acid, 2,2-dimethylolpropionic acid, 2,2-dimethylolbutanoic acid, 2,2-dimethylolpentanoic acid, and combinations thereof.

8. The composition of claim 1, wherein said polymer is poly(tetramethylene ether) glycol, said diisocyante is 4,4'-methylene bis(phenyl isocyante) or a mixture of 4,4'-methylene bis(phenyl isocyante) and 2,4'-methylene bis(phenyl isocyante), and said acidic diol is 2,2-dimethylolpropionic acid or is absent.

9. The composition of claim 1, wherein said polyurethane aqueous dispersion comprises from about 0.1% to about 20% by weight of the fabric care composition.

10. A fabric care composition comprising:
(a) a detergent or fabric softener composition; and
(b) a polyurethaneurea in the form of a powder,
wherein said polyurethaneurea comprises a reaction product of an isocyanate-terminated polyurethane prepolymer and a chain extender;
said prepolymer is a reaction product of a polyether glycol polymer or copolyether glycol polymer; a diisocyanate; and optionally an acidic diol; and
said diisocyante is an aromatic diisocyanate selected from the group consisting of phenylenediisocyanate, tolylenediisocyanate (TDI), xylylenediisocyanate, biphenylenediisocyanate, naphthylenediisocyanate, diphenylmethanediisocyanate (MDI), and combinations thereof.

* * * * *